(12) United States Patent
Borin et al.

(10) Patent No.: US 8,549,267 B2
(45) Date of Patent: Oct. 1, 2013

(54) METHODS AND APPARATUS TO MANAGE PARTIAL-COMMIT CHECKPOINTS WITH FIXUP SUPPORT

(75) Inventors: Edson Borin, San Jose, CA (US); Youfeng Wu, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 12/644,151

(22) Filed: Dec. 22, 2009

(65) Prior Publication Data

US 2011/0153999 A1   Jun. 23, 2011

(51) Int. Cl.
*G06F 7/38*     (2006.01)
*G06F 9/00*     (2006.01)
*G06F 9/44*     (2006.01)
*G06F 15/00*    (2006.01)

(52) U.S. Cl.
USPC ....................................................... 712/228

(58) Field of Classification Search
None
See application file for complete search history.

(56) References Cited

U.S. PATENT DOCUMENTS

| 4,740,969 | A  | 4/1988 | Fremont |
| 5,649,136 | A  | 7/1997 | Shen et al. |
| 7,353,503 | B2 | 4/2008 | Nair et al. |
| 7,877,630 | B1 * | 1/2011 | Favor et al. ..................... 714/20 |
| 2007/0157007 | A1 | 7/2007 | Jourdan et al. |
| 2007/0174750 | A1 | 7/2007 | Borin |

OTHER PUBLICATIONS

Wikipedia, Speculative execution, retrieved from http://en.wikipedia.org/wiki/Speculative_execution, last modified on Aug. 8, 2009, 2 pages.
Kozierok, Charles M., Speculative Execution and Branch Prediction, the PC Guide, http://www.PCGuide.com, Apr. 17, 2001, 3 pages.
Butts et al., Dynamic Dead-Instruction Detection and Elimination, University of Wisconsin-Madison, ASPLOS-X, Oct. 8, 2002, 33 pages.
Gschwind et al., Optimization and Precise Exceptions in Dynamic Compilation, IBM T.J. Watson Research Center, 2001, 9 pages.

* cited by examiner

*Primary Examiner* — Corey S Faherty
(74) *Attorney, Agent, or Firm* — Hanley, Flight & Zimmerman, LLC

(57) ABSTRACT

Example methods and apparatus to manage partial commit-checkpoints are disclosed. A disclosed example method includes identifying a commit instruction associated with a region of instructions executed by a processor, identifying candidate instructions from the region of instructions, and generating a processor partial commit-checkpoint to save a current state of the processor, the checkpoint based on calculated register values associated with live instructions, and including instruction reference addresses to link the candidate instructions.

19 Claims, 8 Drawing Sheets

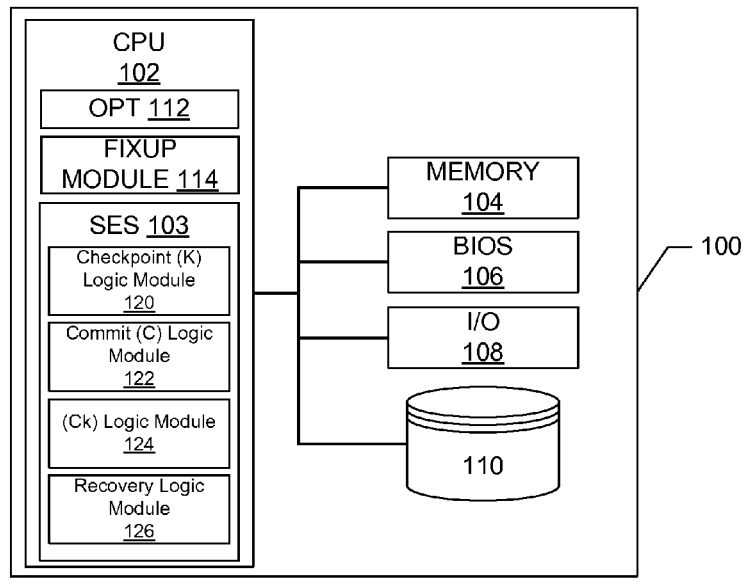
FIG. 1
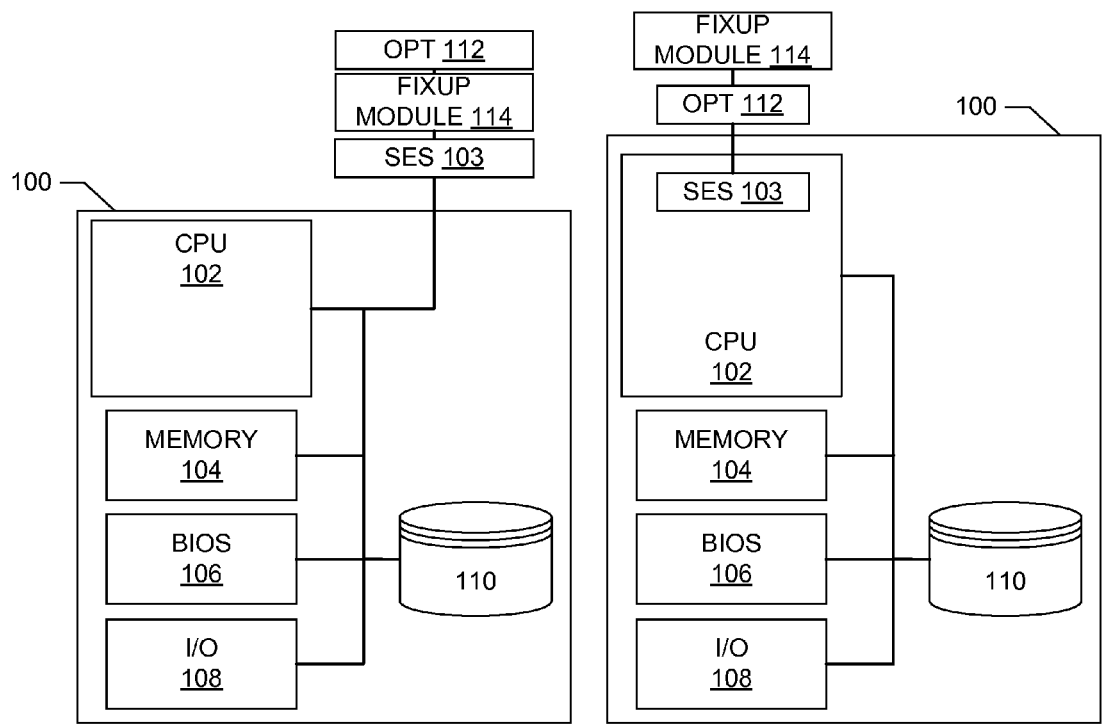
FIG. 2
FIG. 3

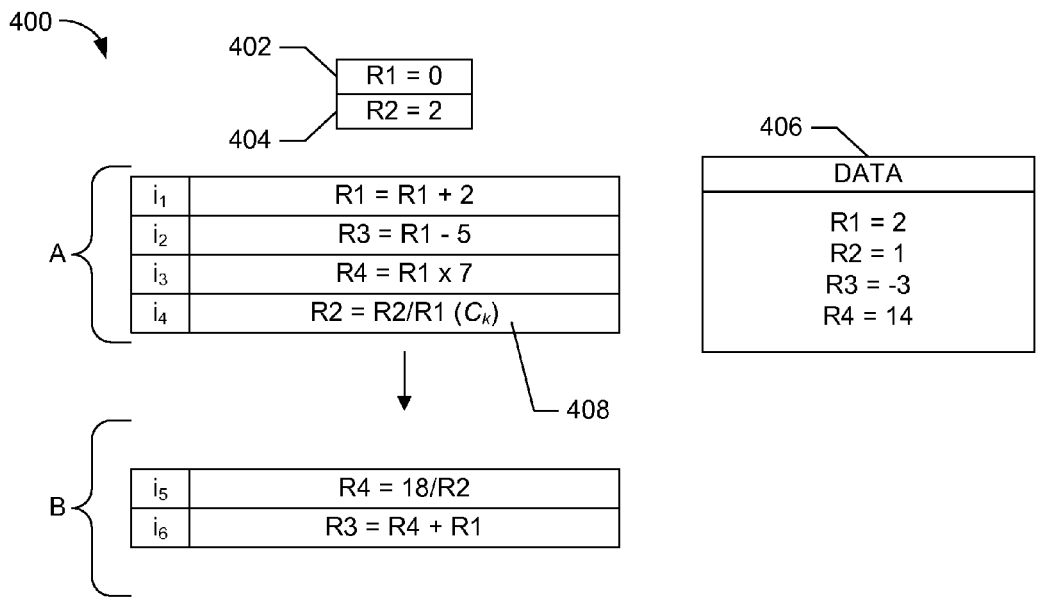
FIG. 4 - PRIOR ART
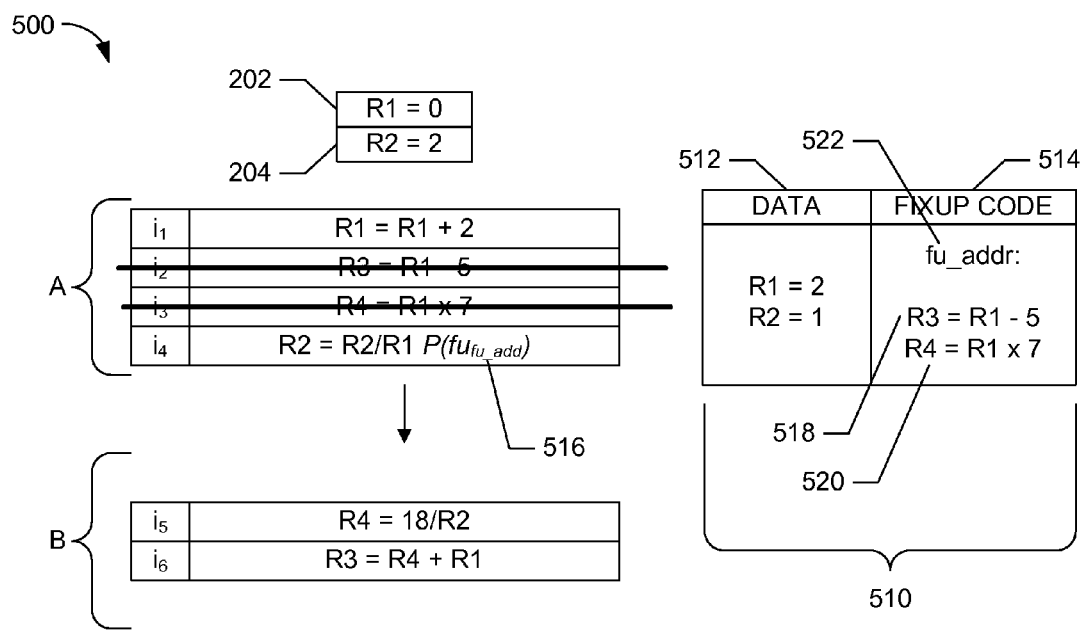
FIG. 5

METHODS AND APPARATUS TO MANAGE PARTIAL-COMMIT CHECKPOINTS WITH FIXUP SUPPORT

TECHNICAL FIELD

The present disclosure relates to speculative execution, and in particular, to methods and apparatus to manage partialcommit-checkpoints with fixup support.

BACKGROUND

In the context of microprocessors, a speculative execution system (SES) is a system that enables the speculative execution of instructions. Speculative execution is typically leveraged to enable safe execution of dynamically optimized code (e.g., execution of optimized regions of code in a hardware (HW) and/or software (SW) co-designed systems). The data produced by the speculative execution of instructions is typically referred to as speculative data. To ensure correct execution, the system may protect the current architectural state (e.g., the state visible by the user) by keeping it unmodified during the speculative execution of instructions.

If the speculative execution is incorrect, the SES discards the speculative data and makes one or more attempts to re-execute the instructions again. In some circumstances, additional attempts to re-execute the instructions occur by way of a more conservative approach (e.g., via a non-speculative execution of instructions, via a smaller degree of speculation in the execution, etc.). On the other hand, in the event that the speculative execution is proven correct, the SES may convert the speculative execution into a non-speculative execution, thereby changing the architectural state. This may be done by promoting the speculative data to non-speculative data.

BRIEF DESCRIPTION OF THE DRAWINGS

FIGS. 1, 2 and 3 are block diagrams of example platforms that may be used by the methods and apparatus described herein to generate partial commit-checkpoints.

FIGS. 4, 5, 6, 7 and 8 are example code blocks that may be executed in connection with the example platforms of FIGS. 1-3.

DETAILED DESCRIPTION

Figure 6:
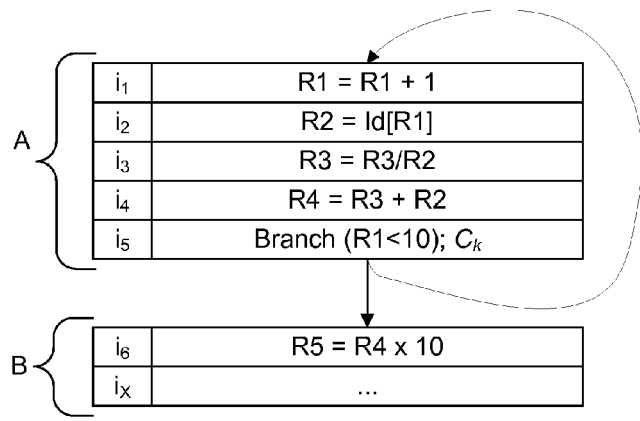

As described in further detail below, the methods and apparatus described herein may be implemented under the assumption that a processor that employs a speculative execution system (SES) may either perform speculative execution (S) of instructions (I), and/or non-speculative execution (N) of instructions (I). Additionally, the example SES may perform a Checkpoint (K) before any speculative execution (S) of instructions. The example Checkpoint ensures that the architectural state of the processor is protected from speculative execution until the SES performs a Commit (C). After the Checkpoint, the processor (e.g., a microprocessor) can speculatively execute any number of instructions. If the speculative execution of the instructions is proven correct, the SES may perform a Commit (C), which may modify the architectural state of the processor with the data computed by the speculative execution. If the speculative execution is incorrect, the SES may perform a Recovery (R) by discarding the speculative data and rolling the execution back to the last Checkpoint performed. After a Commit or a Recovery, the example SES may either start a non-speculative execution of instructions (N) or perform a new Checkpoint and continue speculatively executing other instructions (S).

A speculative execution (S) of instructions is usually limited to instances between a Checkpoint (K) and a Commit (C) or, in some instances between a Checkpoint (K) and a Recovery (R). The dynamic region of code composed by all the instructions speculatively executed between a Checkpoint (K) and a Commit (C) and/or between a Checkpoint (K) and a Recovery (R) may be considered a dynamic atomic region. Additionally, Recovery and Commit operations may be either conditionally coded inside an atomic region (e.g., assert), or dynamically injected by HW when unexpected speculative results are detected (e.g., exception). As used herein, the term "atomic region" refers to instances in which all the speculative data is turned into non-speculative data by the Commit operation (C), and/or all the speculative data is discarded by the Recovery (R) operation.

Dynamic execution of code by an example processor may occur in any number of execution sequences (E). In the illustrated examples of Equations 1 through 3, I refers to zero or more static instructions in a static program, K refers to a dynamic Checkpoint operation performed by an SES execution, C refers to a dynamic Commit operation performed by an SES execution, R refers to a dynamic Recovery operation performed by an SES execution, S refers to a speculative execution of zero or more static instructions (I), and N refers to a non-speculative execution of zero or more static instructions (I).

$$E_1 = KSCKSCKSRNKSC. \qquad \text{Equation 1}$$

$$E_2 = \underbrace{KSC}_{\text{Atomic Execution}} \quad \underbrace{N}_{\text{Non-Spec Execution}} \quad \underbrace{KSR}_{\text{Atomic Execution}} \quad \underbrace{KSC}_{\text{Atomic Execution}}. \qquad \text{Equation 2}$$

$$E_3 = \underbrace{KSC}_{\text{Atomic Execution}} \quad \underbrace{KSC}_{\text{Atomic Execution}} \quad \underbrace{KSR}_{\text{Atomic Execution}} \quad N \quad \underbrace{KSC}_{\text{Atomic Execution}} \quad N \quad \underbrace{KSC}_{\text{Atomic Execution}}. \qquad \text{Equation 3}$$

In some example SESs, execution is optimized by way of employing an operation that performs a Commit (C) and a Checkpoint (K) in a single operation, which may be referred-to as a "Commit-Checkpoint" ($C_k$). An example Commit-Checkpoint ($C_k$) may execute Commit (C) and then a Checkpoint (K) during execution of back-to-back atomic regions. Example Equation 4 below illustrates an example Commit-Checkpoint ($C_k$) derived from Equation 3 above.

$$E_4 = \underbrace{\text{Back to back atomic executions of 3 regions}}_{KSC_kSC_kSR} \qquad \text{Equation 4}$$

$$N \underset{\text{Atomic Execution}}{KSC} N \overset{\text{Atomic Execution}}{\overline{KSC}}.$$

The example Commit-Checkpoint ($C_k$) operations typically save a precise architectural state so that, in the event of a failure of a Speculative execution (S), the example SES may recover the state back to a point in which the Commit-Checkpoint ($C_k$) was performed. The point at which the Commit-Checkpoint ($C_k$) was performed is considered a safe state and allows regular execution to be reattempted. Any such reattempt at execution is typically performed in a more conservative manner, such as by way of non-speculative execution of instructions (N), as shown in example Equation 5 below.

$$E_5 = K_1 S_1 C_{K2} S_2 C_{K3} S_3 C_{K4} S_4 R_4 N_4 K_5 S_5 C_{K6} S_6 C_{K7} \qquad \text{Equation 5.}$$

In the illustrated example of Equation 5, execution five ($E_5$) includes a Commit-Checkpoint ($C_{k4}$) that commits speculative results of $S_3$ and saves a precise architectural state. Thereafter, the example SES performs a Recovery operation ($R_4$) to recover a precise architectural state saved at $C_{k4}$. As described above, in response to one or more failures of speculative execution, some SESs proceed by executing code in a more conservative manner, such as the example Non-Speculative operation ($N_4$) shown above.

In the event that a processor requires a precise architectural state when performing a Commit-Checkpoint operation, dead code and/or partially dead code may not be optimized across the atomic region(s). Generally speaking, partially dead instructions include those that produce a value that may not be used by subsequent computations. Instructions that define architectural values that are not used by code in subsequent atomic regions are partially dead because they still might be needed by exception and/or interruption handlers executed between one or more atomic region(s). For example, in the illustrated example of Equation 5, operations in $S_3$ that compute architectural values that are overwritten by operations in $S_4$ cannot be eliminated because $C_{k4}$ requires a precise architectural state when saving the state. The state saved in the illustrated example must also include the state computed by $S_3$ and overwritten by $S_4$.

The methods and apparatus described herein allow, in part, replacing a Checkpoint ($C_{ki}$) by a partial commit-checkpoint $P_i(fu_i)$ operation that saves only a portion (e.g., a non-precise architectural state) of the architectural state of the processor. As such, one or more optimizations may be performed with one or more atomic regions when dead code and/or partially dead code are identified. The example partial commit-checkpoint $P_i(fu_i)$ is associated with fixup code $fu_i$. In operation, if execution rolls back to the example partial commit-checkpoint $P_i(fu_i)$ and the processor requires a full (precise) architectural state, then the example SES executes the fixup code $fu_i$ to recover the full architectural state.

Checkpoints are created prior to speculative execution so that the prior CPU state may be recovered in the event that a speculation was incorrect. Once the CPU state has been recovered, then execution may resume by executing a more conservative version of the code (e.g., a non-speculative version of code). Creating checkpoints includes saving register values to a storage (e.g., a memory) location representative of the state of the CPU before attempting to execute a speculative path. In some instances, register values to be saved to the storage location may require instruction calculation(s) to derive the register values. As such, creating checkpoints consumes both storage resources and CPU processing resources.

In the event that the speculation was correct, the checkpoint information is no longer needed. Generally speaking, checkpointing result in two storage locations, one containing a speculative CPU state (e.g., speculative storage), and one containing a non-speculative CPU state (e.g., checkpoint storage) that can be restored in the event of an exception. Any register states stored in the non-speculative storage may be discarded in favor of using the speculative storage register states when speculation is correct. The example SES may perform a Commit operation to transfer the data from the speculative storage to the non-speculative storage. Typically, a Commit operation requires the architectural state to be precise, which prevents the SES from removing computed values in the precise state that may never be used in subsequent computations. In other words, when speculation is correct/successful, some CPU resources that are consumed to generate the full precise state may be wasted and/or result in work performed by the CPU that is never utilized.

The methods and apparatus described herein employ, in part, partial commit-checkpoint operations to relax the precise architectural state constraints and enable more aggressive dynamic optimizations (e.g., across dynamic atomic regions). For example, the methods and apparatus described herein generate fixup code that may be executed only when necessary (e.g., after an exception occurs) rather than explicitly calculating a register state before storing to the non-speculative storage location(s). As a result, rather than consuming CPU cycles to calculate a precise register state prior to storage in the non-speculative storage location(s), an address of the generated fixup code, which is known a priori may be stored instead, thereby reducing CPU cycle consumption during the speculative execution process.

FIG. 1 is a schematic illustration of an example platform 100 that may be used with the methods and apparatus described herein. In the illustrated example of FIG. 1, the platform 100 includes a CPU 102, a speculative execution system (SES) 103, a memory 104, a basic input/output system (BIOS) 106, one or more input/output (I/O) device(s) 108, hard disk drive (HDD) and/or optical storage 110, a dynamic optimizer module (OPT) 112, and a fixup module 114. The example fixup module 114 may include the OPT 112 and the SES 103, but is not limited as such. Additionally, the example SES 103 includes an example Checkpoint (K) logic module 120, a Commit (C) logic module 122, a Commit-Checkpoint ($C_k$) logic module 124, and a recovery logic module 126. Without limitation, the example platform 100 may include any number and/or type of elements other than those shown in FIG. 1.

In operation, the example CPU 102 executes code retrieved from the example memory 104, the example BIOS 106, the example I/O 108 (including sources external to the example platform 100 such as, but not limited to an intranet, the Internet, etc.), and/or the example HDD 110. During code execution, the SES 103 may execute one or more dynamically optimized code regions, thereby minimizing instances of CPU stall. To ensure correctness, the example SES 103 may Checkpoint (e.g., via the example Checkpoint (K) logic module 120) the architectural state of the example CPU 102, execute the optimized code, and Commit (e.g., via the example Commit (C) logic module 122) the speculative results after the execution is proven correct. However, in the event that the execution is incorrect (e.g., due to one or more exception(s)), the example SES 103 rolls the execution back by recovering the checkpoint (e.g., via the example Recovery logic module 126) and restarting execution with a more conservative (e.g., less speculative) execution. When the example OPT 112 identifies a region of code for optimization, the OPT 112 may analyze an instruction from the region to determine if it is a candidate instruction for fixup code. As described in further detail below, fixup code includes, but is not limited to pointers to executable instructions and/or executable instructions stored in a memory for later execution, if necessary. If candidate instructions for fixup code are found, the example OPT 112 generates a partial commit-checkpoint, generates fixup code, and the example fixup module 114 associates the address of the fixup code with the partial commit-checkpoint operation. In effect, the partial commit-checkpoint operation of the fixup module 114 enables the example platform 100 to perform a checkpoint operation without requiring a precise architectural state of the CPU 102. In the event that the CPU precise architectural state needs to be restored (e.g., due to an exception), the example SES 103 references the address of the generated fixup code to calculate the precise register value corresponding to the optimized instruction(s). In other words, CPU resources directed to calculating the precise register value do not need to occur until after the exception condition is proven to be true.

At least one benefit realized in view of the example partial commit-checkpoint operation implemented by the example fixup module 114 is a reduction in CPU resources that are otherwise consumed by executing all instructions associated with register value calculation(s). For instances where speculation is correct, the quantity and/or CPU burden is reduced by avoiding one or more calculations of all CPU register values. On the other hand, for instances where speculation is incorrect, the methods and apparatus described herein facilitate a mechanism to calculate a precise register state.

While the illustrated example of FIG. 1 includes the OPT 112 and the fixup module 114 within the example platform 100, the methods and apparatus described herein are not limited thereto. For example, the example SES 103, OPT 112 and/or the example fixup module 114 may be located externally to the example platform, as shown in FIG. 2. Alternatively, the example OPT 112 and/or the example fixup module 114 may be located external to the example CPU 102 as software and/or hardware, as shown in FIG. 3. One or more descriptions of the methods and apparatus described herein will generally reference the example platform 100 as shown in FIG. 1, but such descriptions are for purposes of illustration and not limitation.

FIGS. 4 and 5 illustrate two examples that employ commit-checkpoint operations (400, 500), the first of which (i.e., FIG. 4) may be employed by the CPU 102 to commit a speculative state generated by region A and create a traditional checkpoint, and the second of which (e.g., FIG. 5) is an example operation in view of the methods and apparatus described herein. In the illustrated example of FIG. 4, a first atomic region A includes four instructions ($i_1$, $i_2$, $i_3$, and $i_4$) and a second atomic region B includes two instructions ($i_5$ and $i_6$). FIG. 4 illustrates an example control flow graph (CFG), in which Atomic regions A and B may each be referred to as a node and paths of execution between nodes may be referred to as an edge (represented by an arrow). During one or more optimization processes executed by, for example, the OPT 112 of the CPU 102, instructions may be analyzed to identify partially dead code (also referred to as partially dead instructions). As described herein, the example SES 103 includes a system that provides support for checkpoint, commit and/or recovery operations to enable speculative execution, but the example SES 103 is not limited thereto. Additionally, as described herein and in further detail below, the example OPT 112 facilitates, in part, dynamic optimization(s) and/or fixup code generation. In the event that a full precise architecture state is deemed necessary, the example SES 103 may invoke the fixup code after a Recovery operation(s).

As described above, partially dead instructions are instructions that produce a value that may not be used by subsequent computation. Instructions that define architectural values that are not used by code in subsequent atomic regions are partially dead because they may still be needed by exception and/or interruption handlers executed between atomic regions.

In the illustrated example of FIG. 4, register $R_1$ is initially zero (402) and register $R_2$ is initially populated with a value of two (404) when entering atomic region A. Example instruction $i_1$ calculates a value for register $R_1$ as the existing value of register $R_1$ plus the integer two. Example instruction $i_2$ uses the calculated value of $R_1$ in its calculation to derive a value for register $R_3$. Additionally, example instruction $i_2$ calculates a value for register $R_3$, which uses the previously calculated value $R_1$. Example instruction $i_3$ calculates a value for register $R_4$ that also uses the previously calculated value $R_1$. Finally, example instruction $i_4$ in atomic region A calculates a value for $R_2$, which uses value $R_2$ itself divided by the previously calculated value $R_1$. Of the four example instructions $i_1$, $i_2$, $i_3$ and $i_4$ of atomic region A, only instructions $i_2$ and $i_3$ are considered partially dead code because their result has no further effect on either any other instruction within atomic region A or any subsequent atomic region(s). That is, the results computed by $i_2$ and $i_3$ cannot be used by computations executed after region B because region B overwrites the computed results when executing instruction $i_5$ and $i_6$, but they may be required in the event that an exception and/or interruption is handled between regions A and B. In other words, if no extraordinary events (such as an interruption and/or exception) happen after region A commits and before region B commits, then instructions $i_2$ and $i_3$ are not required because their results will not be used. Nonetheless, in case of extraordinary events (e.g., exceptions), the CPUs have to provide a precise architectural state to an exception handler. This is usually realized by requiring that checkpoints reflect absolute state precision. In this example, each of instructions $i_1$, $i_2$, $i_3$ and $i_4$ are calculated to allow the precise values for $R_1$, $R_2$, $R_3$ and $R_4$ to be saved by the Commit-Checkpoint operation at $i_4$. Checkpoint storage 406 shows the architectural state after the $C_k$ operation at $i_4$. The end of an atomic region, such as the example atomic region A of FIG. 4, may be terminated with a commit-checkpoint instruction ($C_k$) 408, which is a representation of the end of an atomic region and the beginning of a new atomic region, and causes the CPU 102 to commit the speculative execution of the executed atomic region and record a new checkpoint to enable the speculative execution of the next region. Generally speaking, whenever a commit is performed, the effects of the instructions in the atomic region become visible to other devices (e.g., other processors), and corresponding effects (e.g., register updates, memory stores, etc.) are made permanent. Although commit marks are described herein, the methods and apparatus described herein are not limited thereto and may be applied to other atomic regions and/or commit models without limitation.

Atomic region B represents a branch from atomic region A. In the illustrated example of FIG. 4, atomic region B includes instruction $i_5$ to calculate a value for register $R_4$ and instruction $i_6$ to calculate an instruction for $R_3$. As an exception may occur at any point of execution, providing a mechanism to commit-checkpoint with full precision facilitates, in part, an ability to recover in a safe manner. Additionally, the commit-checkpoint consumes CPU cycles by requiring calculation(s) for each register within any affected atomic region(s). The methods and apparatus described herein facilitate, in part, providing for full precision checkpointing and reducing CPU resource consumption during one or more checkpointing operation(s). The example atomic regions A and B and instructions $i_1$, $i_2$, $i_3$, $i_4$, $i_5$ and $i_6$ of FIG. 5 are substantially similar to the atomic regions and instructions in FIG. 4. However, unlike the example of FIG. 4, where the precise architectural state 406 is saved by the $C_k$ operation 408, the illustrated example of FIG. 5 includes a partial commit-checkpoint 516 that saves part of the architectural state 512 and includes associated fixup code 514 that can be executed to recover the full (precise) architectural state in case it is needed. Instructions $i_2$ and $i_3$ in atomic region A of FIG. 5 are shown crossed-out as an indication of code that was removed by the example OPT 112, thereby improving the execution by avoiding additional CPU cycles toward calculation of instructions $i_2$ and $i_3$. However, to allow the recovery of the precise architectural state in the event of an exception occurring in atomic region B and/or anywhere between regions A and B, the fixup code 514 is created. The example partial commit-checkpoint instruction 516 causes the address(es) of the fixup code (fu_add) to be associated with the partial commit-checkpoint.

In operation, the example partial commit-checkpoint operation 500 generates a non-precise checkpoint 510 by eliminating the computation of instructions $i_2$ and $i_3$. The instructions associated with $i_2$ and $i_3$ may be copied from the atomic region A to the example fixup code 514 during the dynamic optimization. Unlike the identified partially dead instructions $i_2$ and $i_3$, any remaining instructions are executed ($i_1$ and $i_4$) and their speculatively calculated values 514 are committed and saved by the partial commit-checkpoint at $i_4$. As a result, CPU instructions that would have been consumed to calculate register values $R_3$ and $R_4$ are avoided, thereby improving a CPU utilization metric during region A execution.

Figure 7:
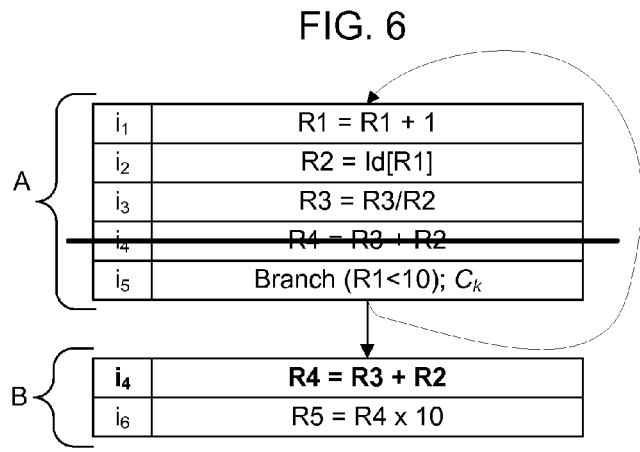

In other examples, an atomic region may execute over any number of iterations and/or in a loop. In the illustrated example of FIG. 6, atomic region A includes instructions $i_1$, $i_2$, $i_3$, $i_4$ and $i_5$, and atomic region B includes instruction $i_6$. While instruction $i_4$ calculates register value $R_4$ during each loop iteration, register $R_4$ is not used again in atomic region A and the computation represents wasted CPU cycles. The illustrated example of FIG. 7 shows how to improve the regions of FIG. 6 by, in part, removing instruction $i_4$ (see cross-out) and moving it to atomic region B, which does require register value $R_4$ when computing instruction $i_6$. In this example, the value of register $R_4$ is only computed after leaving the loop, which may reduce the number of times that $i_4$ is executed. Although removal of instruction $i_4$ successfully saves CPU cycles from being consumed, such removal results in the commit-checkpoint operation of region A to save a processor state that lacks precision. In this example, if the state needs to be recovered to this checkpoint, the architectural state will not be precise.

Figure 8:
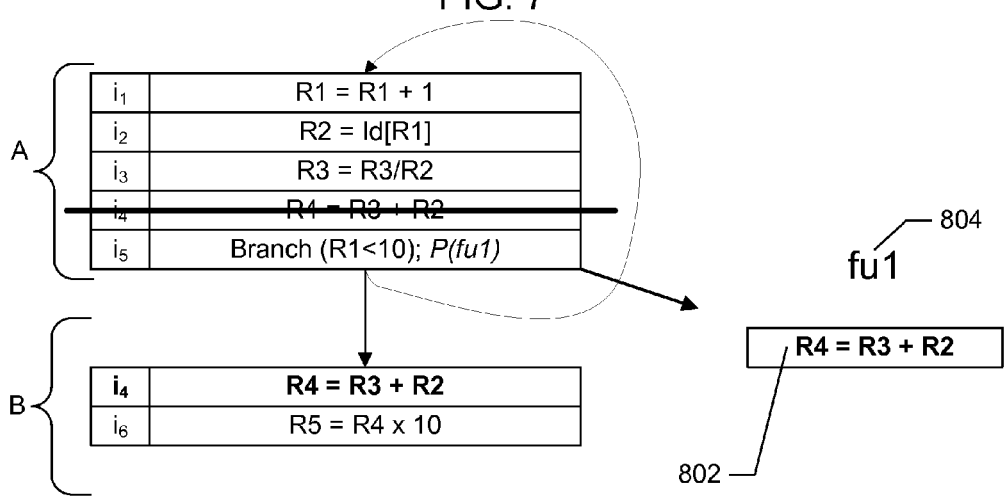

To allow the precise architectural state to be reconstructed when recovering the state saved by the partial commit-checkpoint, the methods and apparatus described herein permit fixup code to be generated for the removed instruction $i_4$ from atomic region A. As a result, when an exception occurs, a precise state of the CPU may be re-constructed during the recovery operation. For example, FIG. 8 illustrates fixup code 802 associated with fixup label $fu_1$ 804. The fixup code 802 represents instruction $i_4$ so that, in the event of recovery to the partial commit-checkpoint performed at $i_5$ in atomic region A, the precise state of register $R_4$ can be recovered. In case a recovery happens and the precise state is required, the example SES 103 can execute the associated fixup code 802 and reconstruct the full precise state.

Figure 9:
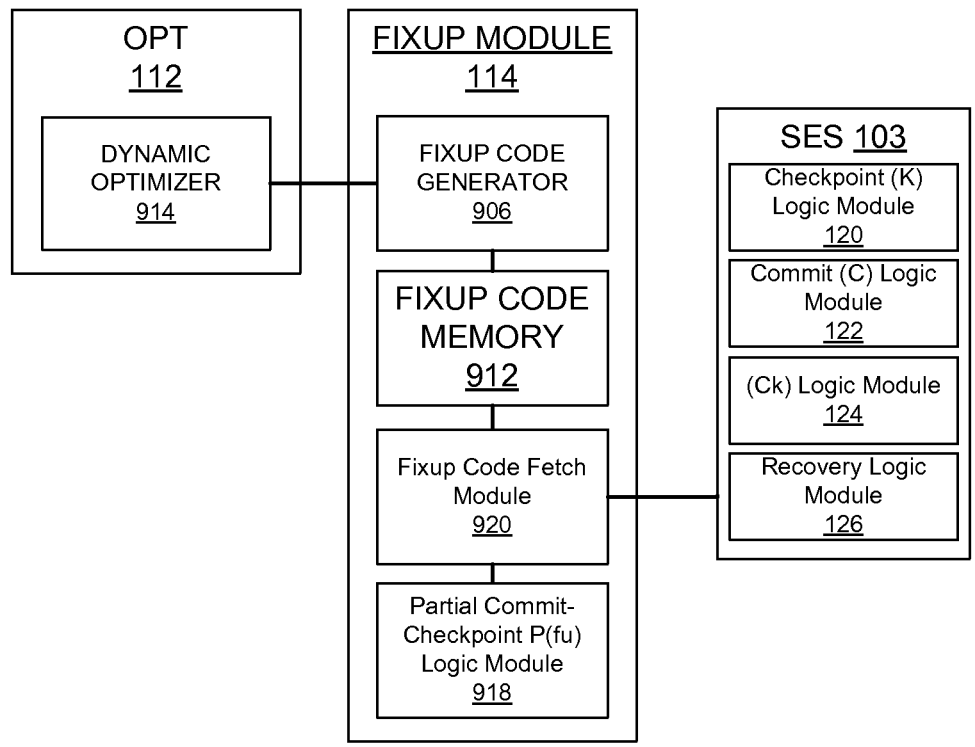
FIG. 9 is a block diagram of an example fixup code circuit that may be used by the example platforms of FIGS. 1-3.

FIG. 9 is a schematic illustration of the example fixup module 114, OPT module 102 and SES 103 of FIG. 1. In the illustrated example of FIG. 9, the fixup module 114 includes a fixup code generator 906, a fixup code memory 912, a fixup code fetch module 920 and a partial Commit-Checkpoint P(fu) logic module 918. As described above in connection with FIG. 1, the example SES 103 includes the Checkpoint (K) logic module 120, the Commit (C) logic module 122, the Commit-Checkpoint ($C_k$) logic module 124 and the recovery logic module 126, and the example OPT 112 includes a dynamic optimizer 914.

The example fixup module 114 facilitates generation of fixup code in response to one or more requests. Requests to generate fixup code may be generated by the example dynamic optimizer 914 in response to receiving one or more indications to optimize code in a speculative manner. The example fixup code generator 906 may associate an address associated with candidate code with a fixup code label. Fixup code generated by the fixup code generator 906 and associated label(s) may be stored in the example fixup code memory 912. While the example fixup code memory 912 is shown as part of the example fixup module 114, the example fixup code memory 912 may be located elsewhere, without limitation. In operation, the example fixup module 114 may employ the partial commit-checkpoint logic module 918 in the example fixup module 114 to invoke a partial commit-checkpoint, as described above. In response to a request to invoke the fixup code, the example fixup code fetch module 920 queries and/or otherwise retrieves fixup code from the fixup code memory 912 that was previously generated by the example fixup code generator 906.

To provide support for Checkpoint (K), Commit (C), Commit-Checkpoint (Ck) and/or recovery operations, the example SES 103 invokes one or more of the example Checkpoint (K) logic module 120, the example Commit (C) logic module 122, the example Commit-Checkpoint (Ck) logic module 124 and/or the example recovery logic module 126. In operation, in response to one or more requests from the example SES 103, the example fixup code fetch module 920 queries and/or otherwise acquires fixup code from the example fixup code memory 912.

While the example platform 100 and fixup module 114 of FIGS. 1-3 and 9 have been shown to create partial commit-checkpoints to improve checkpoint creation speed and efficiency, one or more of the elements and/or devices illustrated in FIGS. 1-3 and 9 may be combined, divided, re-arranged, omitted, eliminated and/or implemented in any other way. Further, the example CPU 102, SES 103, memory 104, BIOS 104, OPT 112, fixup module 114, fixup code generator 906, fixup code memory 912, dynamic optimizer 914, partial commit-checkpoint logic module 918 and/or fixup code fetch module 920 of FIGS. 1-3 and 9 may be implemented by one or more circuit(s), application specific integrated circuit(s) (ASIC(s)), programmable logic device(s) (PLD(s)), and/or field programmable logic device(s) (FPLD(s)), etc. When any of the appended apparatus claims are read to cover a purely software and/or firmware implementation, at least one of the example CPU 102, SES 103, memory 104, BIOS 104, OPT 112, fixup module 114, fixup code generator 906, fixup code memory 912, dynamic optimizer 914, partial commit-checkpoint logic module 918 and/or fixup code fetch module 920 of FIGS. 1-3 and 9 are hereby expressly defined to include a tangible medium such as a memory, DVD, CD, etc. storing the software and/or firmware. Further still, the example CPU 102, SES 103, memory 104, BIOS 104, OPT 112, fixup module 114, fixup code generator 906, fixup code memory 912, dynamic optimizer 914, partial commit-checkpoint logic module 918 and/or fixup code fetch module 920 of FIGS. 1-3 and 9 may include one or more elements, processes and/or devices in addition to, or instead of, those illustrated in FIGS. 1-3 and 9, and/or may include more than one of any or all of the illustrated elements, processes and devices.

Figure 10:
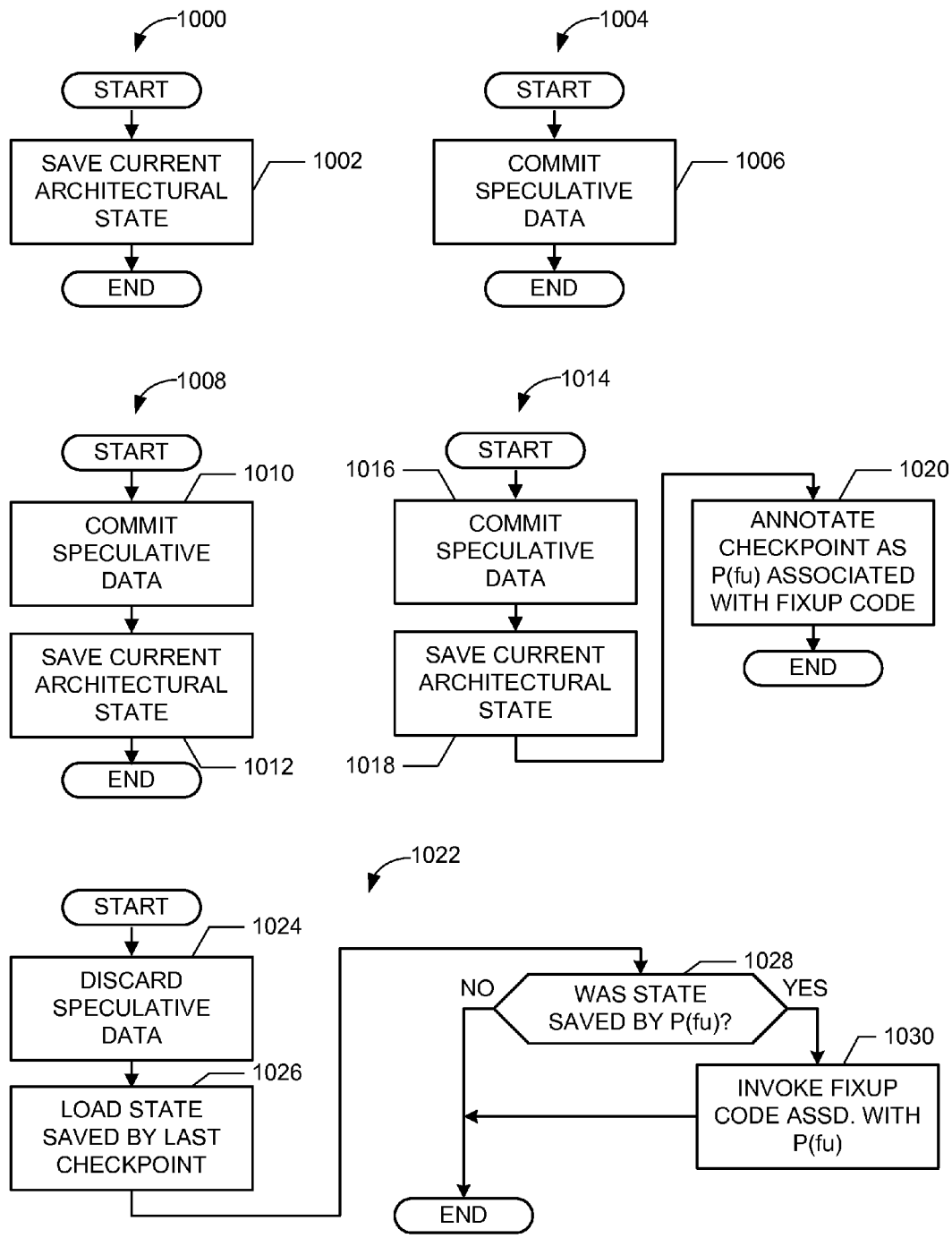
FIGS. 10-12 are example processes that may be carried out using instructions stored on tangible machine readable media to implement the example fixup code circuit of FIGS. 1-3 and 9.
Figure 11:
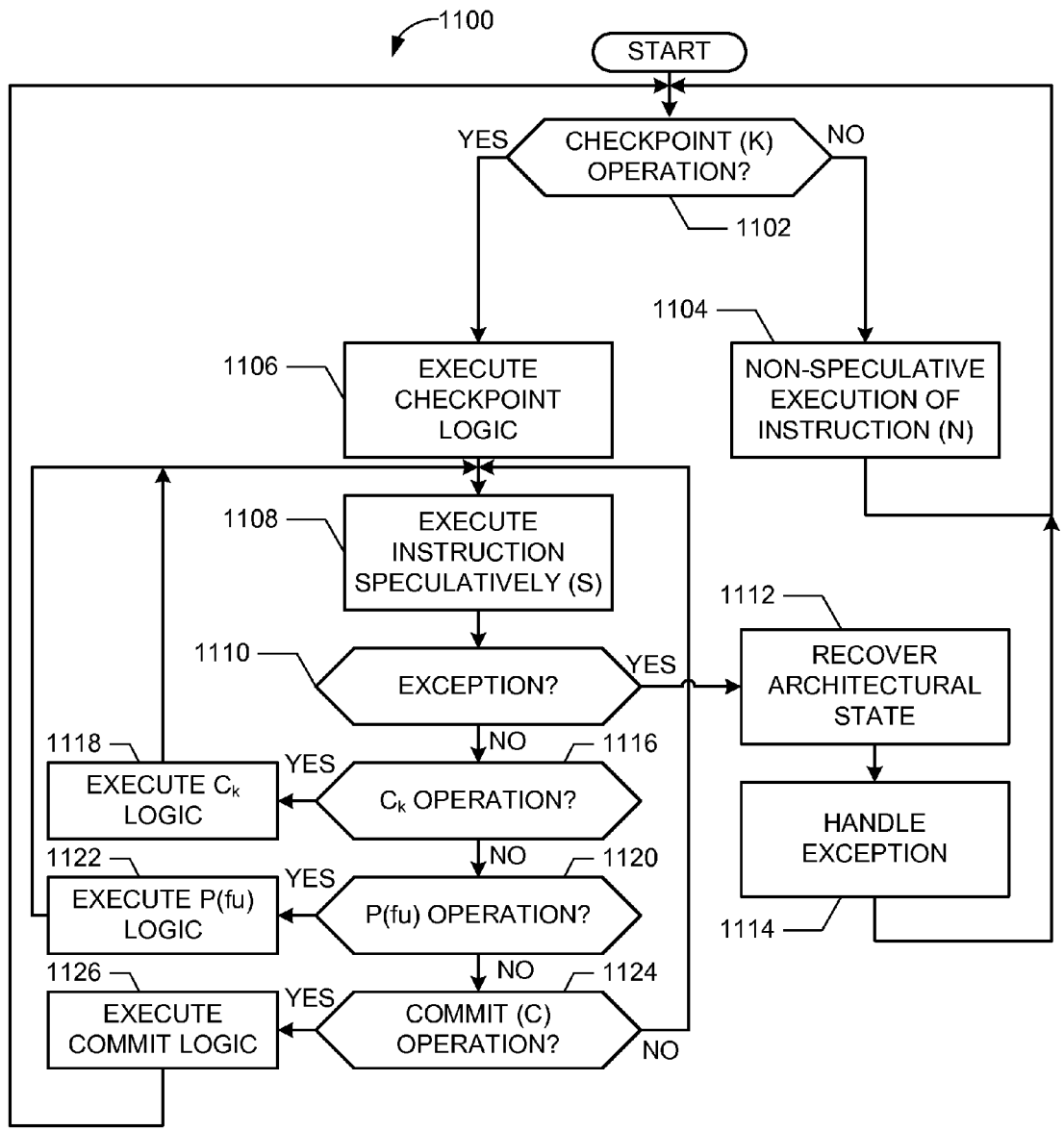
Figure 12:
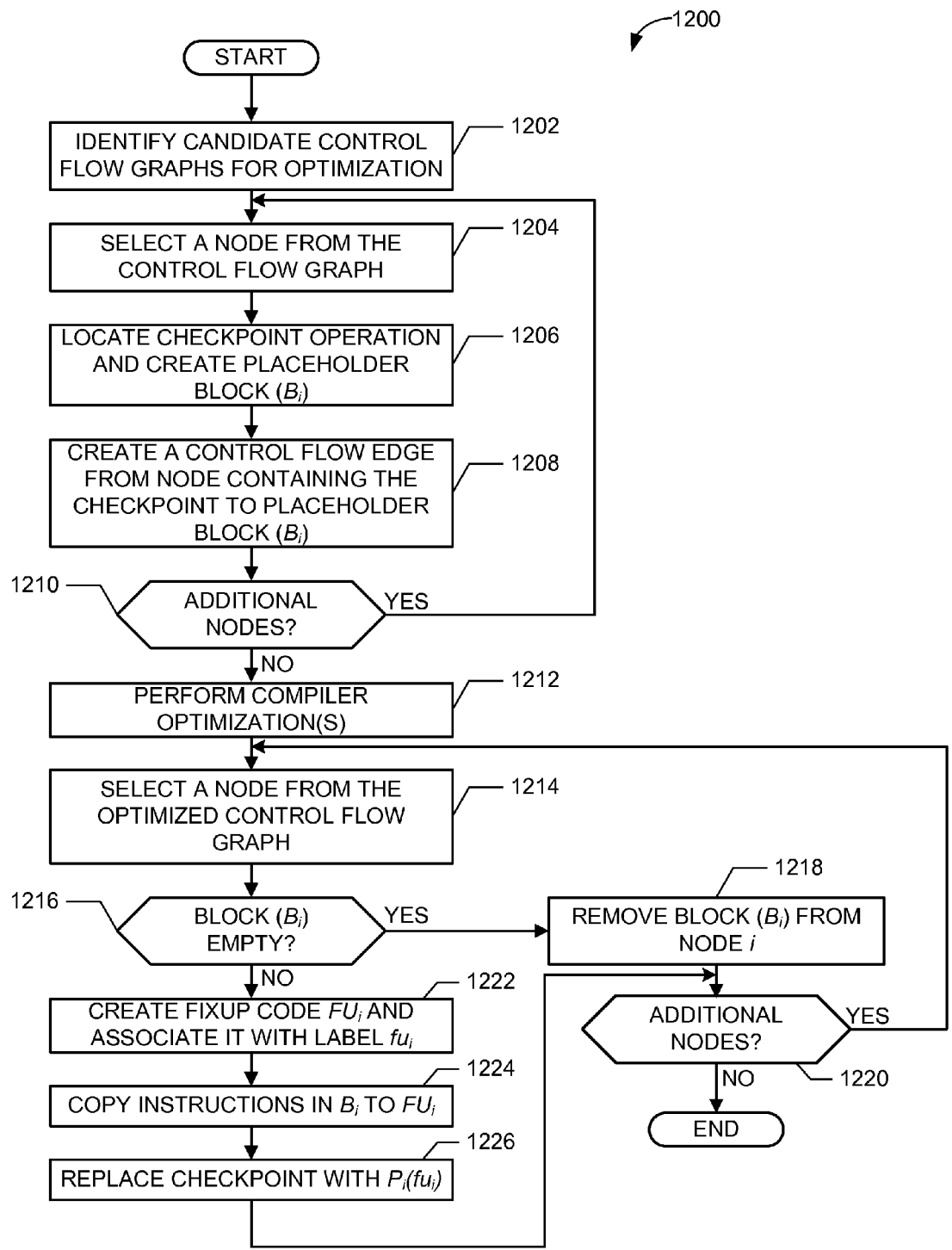

FIGS. 10-12 illustrate example processes that may be performed to implement the example SES 103, OPT 112 and fixup 114 modules of FIGS. 1-3 and 9. The example processes of FIGS. 10-12 may be carried out by a processor, a controller and/or any other suitable processing device. For instance, the example processes of FIGS. 10-12 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 13). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 10-12 may be implemented using any combination(s) of ASIC(s), PLD(s), FPLD(s), discrete logic, hardware, firmware, etc. Also, one or more operations of the example processes of FIGS. 10-12 may instead be implemented manually or as any combination of any of the foregoing techniques, for example, any combination of firmware, software, discrete logic, and/or hardware. Further, many other methods of implementing the example operations of FIGS. 10-12 may be employed. For example, the order of execution of the blocks described may be changed, and/or one or more of the blocks described may be changed, eliminated, sub-divided, or combined. Additionally, any or all of the example processes of FIGS. 10-12 may be carried out sequentially and/or carried out in parallel by, for example, separate processing threads, processors, devices, discrete logic, circuits, etc.

The example processes of FIG. 10 include a checkpoint logic process 1000, a commit logic process 1004, a commit-checkpoint logic process 1008, a partial commit-checkpoint logic process 1014, and a recovery logic process 1022. The example checkpoint logic process 1000, which may be executed by the example checkpoint logic module 120 of FIGS. 1-3 and 9, saves a current architectural state of a CPU (block 1002). The example commit logic process 1004, which may be executed by the example commit logic module 122 of FIGS. 1-3 and 9, commits any speculative data that may have been saved to a storage (e.g., a memory) during one or more speculation operation(s) (block 1006). The example commit-checkpoint logic process 1008, which may be executed by the example commit-checkpoint logic module 124 of FIGS. 1-3 and 9, commits any speculative data (block 1010), and then saves the currently architectural state of the CPU (block 1012).

Unlike traditional speculation approaches, the example partial commit-checkpoint logic process 1014, which may be executed by the example fixup module(s) 114 and/or the example partial commit-checkpoint 918 of FIG. 9, commits any speculative data to a memory (block 1016) and saves an architectural state of the CPU (block 1018). Thereafter, the example process 1014 annotates the recently created checkpoint as a partial commit-checkpoint and associates it with fixup code (fu) (block 1020). The example fixup code (fu) may be created by the example fixup code generator 906, as shown in FIG. 9.

During instances in which a recovery operation occurs (block 1022), which may be executed by the example recovery logic module 126, any speculative data that was previously stored is discarded (block 1024). To allow further safe operation of the CPU, the state of the CPU at the checkpoint is loaded (block 1026) and the example fixup code fetch module 920 determines whether the previously saved state is also a partial commit-checkpoint (block 1028). If not, then control advances in a traditional manner, otherwise the fixup code fetch module 920 invokes any fixup code (fu) associated with the partial commit-checkpoint (block 1030) to obtain full precision.

FIG. 11 illustrates an example process 1100 of CPU execution in view of the methods and apparatus described herein. If no checkpoint operation occurs (block 1102), then instructions are executed in a non-speculative manner (block 1104). On the other hand, in the event of a checkpoint operation (block 1102), checkpoint logic may be executed (block 1106) and one or more instructions may be executed in a speculative manner (block 1108). In the event of an exception (block 1110), the example recovery logic module 126 may initiate a recovery of the architectural state (block 1112) and handle the exception (block 1114), as described in the example process 1022 of FIG. 10. On the other hand, if there is no exception (block 1110), the example SES 103 determines if a checkpoint operation of type commit-checkpoint ($C_k$) was to be executed (block 1116). If so, then the example commit-checkpoint logic module 124 may execute commit-checkpoint logic (block 1118), such as by way of the example process 1008 of FIG. 10.

If the example SES 103 determines that a checkpoint of type partial commit-checkpoint was to be executed (block 1120), then the example partial commit-checkpoint logic module 918 may execute partial commit-checkpoint logic (block 1122), such as by way of the example process 1014 of FIG. 10. In the event that the example SES 103 determines the occurrence of a commit operation (block 1124), then the example commit logic module 124 may execute the example process 1004 of FIG. 10 (block 1126). In case none of the previous operations are detected, the SES 103 may proceed by speculatively executing more instructions (block 1108).

The methods and apparatus described herein also improve one or more optimization techniques (e.g., partial dead code elimination (PDE)) that may be employed by processors and/or platforms. Generation of fixup code and analysis of executable code, such as analysis of one or more control flow graphs (CFGs), may be realized by the example OPT 112. Traditional optimization techniques typically evaluate a single atomic region node at a time, but cannot perform one or more evaluative optimizations across multiple nodes.

To facilitate, in part, optimization across regions (nodes), the example dynamic optimizer 914 analyzes a CFG node for instances of a checkpoint operation, such as a commit-checkpoint operation ($C_k$). In response to detecting the checkpoint operation, the example dynamic optimizer 914 generates a placeholder block and connects the block that contains the checkpoint operation to the placeholder block by using a control flow edge before moving on to another CFG node, if any. When any number of CFG nodes have been analyzed to detect instances of a checkpoint operation, the example dynamic optimizer 914 proceeds with the optimization. During optimization, the example dynamic optimizer 914 may identify partially dead code candidates and move code from one node to another node to optimize one or more paths (edges). For example, a generated node may be an atomic region or one of the placeholder blocks inserted previously by the example dynamic optimizer 914.

When the optimization is complete, the example OPT 112 invokes the example dynamic optimizer 914 to identify which placeholder blocks are still empty (e.g., the optimization technique employed did not identify any changes to further optimization), and which placeholder blocks are populated with code after the optimization. Empty placeholder blocks may be removed because, in part, they have no further use for the optimization. However, placeholder blocks that are not empty are indicative of an architectural state that is no longer precise in response to a checkpoint operation (e.g., $C_k$). The non-empty placeholder blocks contain instructions that, when executed, fix and/or otherwise ensure a precise architectural state associated with the checkpoint operation. In this sense, the example dynamic optimizer 914 modifies the optimized code by promoting the non-empty block to contain fixup code and by replacing the commit-checkpoint operation by a partial commit-checkpoint P(fu) with associated fixup code fu.

FIG. 12 illustrates an example process 1200 that may be realized by the methods and apparatus described herein. The example process 1200 of FIG. 12 begins with identifying candidate control flow graphs (CFGs) for optimization (block 1202). Any number of sections, regions and/or portions of a CFG may be identified by the example OPT 112. A node from the CFG is selected (block 1204), in which each node may include any number of instructions, and a checkpoint operation is located within the selected node to create a placeholder block ($B_i$) (block 1206). Each example node from the example CFG may be designated with an identifier i. As such, the example nomenclature $B_i$ refers to a placeholder block associated with the $i^{th}$ node. The example dynamic optimizer 914 creates a control flow edge from the $i^{th}$ node containing the checkpoint operation and points to (i.e., directs control flow toward) the placeholder block ($B_i$) (block 1208). In the event that the example CFG and/or subset of CFGs include additional nodes (block 1210), then control returns to block 1204.

In the event that the example CFG and/or subset of CFGs do not include any additional nodes that have not already been analyzed by the example dynamic optimizer 914 (block 1210), then one or more compiler optimization(s) are allowed to proceed (block 1212). Any type of compiler optimization may occur including, but not limited to forward code motion optimization(s) and/or partial dead code elimination optimization(s). The example dynamic optimizer 914 selects a node from the optimized CFG and/or subset of CFGs (block 1214), such as the $i^{th}$ node. If the placeholder block ($B_i$) associated with the ith node is empty (block 1216), then $B_i$ is removed from the $i^{th}$ node (block 1218). If the optimized CFG and/or subset of CFGs include additional nodes that have not yet been analyzed (block 1220), then control returns to block 1214 to select another node.

However, if Bi is not empty (block 1216), which is indicative of a circumstance where an architectural state is no longer precise in response to a checkpoint operation (e.g., $C_k$), then the example dynamic optimizer 914 creates fixup code $FU_i$ and associates it with label $fu_i$ (block 1222). Additionally, any instructions that are contained within $B_i$ based on the prior optimization are copied to $FU_i$ (block 1224), and the checkpoint previously located in the $i^{th}$ node is replaced with a partial commit-checkpoint $P_i(fu_i)$ (block 1226). If the optimized CFG and/or subset of CFGs include additional nodes that have not yet been analyzed (block 1220), then control returns to block 1214 to select another node, otherwise the example process 1200 ends.

Figure 13:
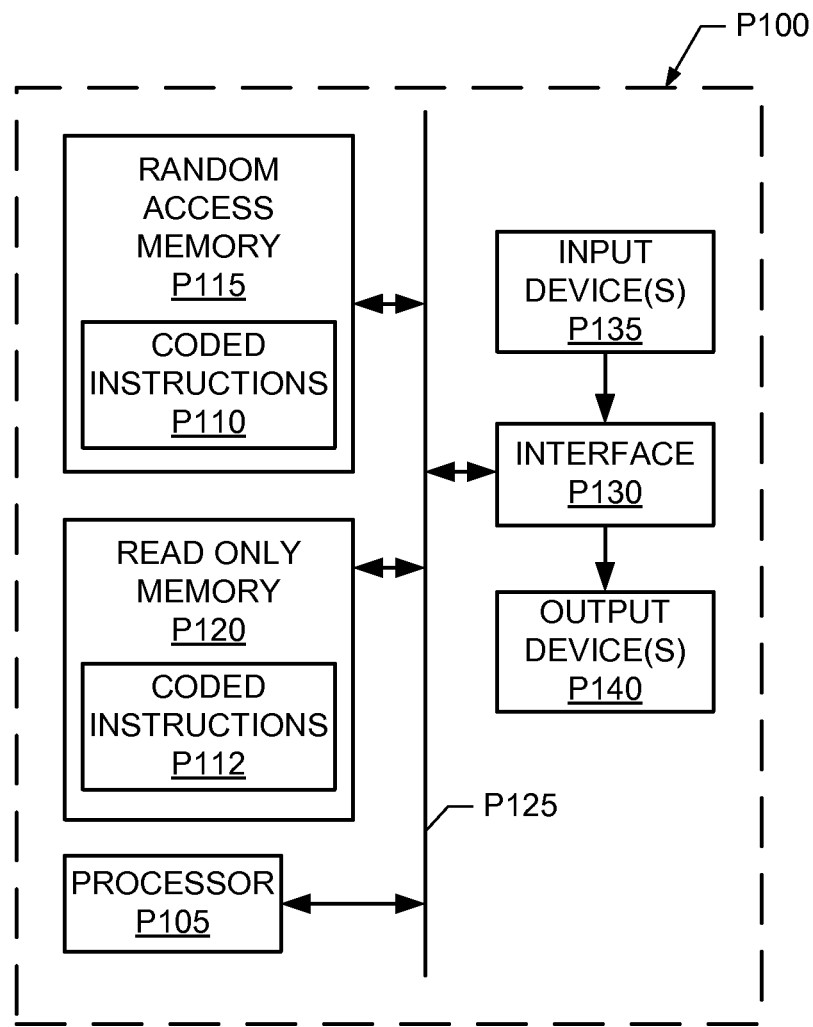
FIG. 13 is a schematic diagram of an example processor platform that may execute the example processes of FIGS. 10-12 and/or the example fixup code circuit of FIGS. 1-3 and 9.

FIG. 13 is a schematic diagram of an example processor platform P100 that may be used and/or programmed to implement any or all of the example CPU 102, SES 103, memory 104, BIOS 104, OPT 112, fixup module 114, fixup code generator 906, fixup code memory 912, dynamic optimizer 914, partial commit-checkpoint logic module 918 and/or fixup code fetch module 920 of FIGS. 1-3 and 9. For example, the processor platform P100 can be implemented by one or more general-purpose processors, processor cores, microcontrollers, etc.

The processor platform P100 of the example of FIG. 13 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 10-13 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example fixup code memory 912.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to generate a partial commit-checkpoint, comprising:
   distinguishing between first instructions and candidate instructions from a region of instructions, the candidate instructions to produce an unused value in the region of instructions;
   generating a processor partial commit-checkpoint to save a current state of a processor, the partial commit-checkpoint based on calculated register values associated with the first instructions; and
   generating an instruction reference address to link the candidate instructions to fixup code to prevent calculating register values associated with the candidate instructions in response to a speculative execution event.

2. A method as defined in claim 1, further comprising generating the fixup code based on the candidate instructions to associate with the instruction reference address.

3. A method as defined in claim 2, wherein the fixup code recovers a state associated with the candidate instructions in response to a processor recovery instruction.

4. A method as defined in claim 2, wherein the fixup code is saved to a fixup code memory and accessible by an exception handler of the processor.

5. A method as defined in claim 4, wherein the exception handler of the processor comprises a speculative execution system to invoke a recovery operation.

6. A method as defined in claim 2, wherein the fixup code is prevented from being executed until a precise architectural state is required by the processor.

7. A method as defined in claim 2, wherein the instruction reference address comprises a pointer to access the fixup code.

8. A method as defined in claim 2, wherein the instruction reference address comprises a copy of executable code indicative of the fixup code.

9. A method as defined in claim 1, wherein the region of instructions are executed atomically by the processor.

10. A method as defined in claim 1, wherein the instruction reference address comprises executable instructions to calculate a precise register value of the processor in response to an exception.

11. A method as defined in claim 10, wherein the register value comprises a memory value.

12. A method as defined in claim 10, further comprising passing control to an exception handler after the executable instructions associated with the instruction reference address are executed to calculate the register value.

13. An apparatus to generate a processor partial commit-checkpoint, comprising:
a speculative execution system to distinguish between first instructions and second instructions associated with a block of code, the first instructions to produce a dependent value and the second instructions to produce an unused value;
a partial commit-checkpoint logic module to calculate register values associated with the first instructions to associate a partial commit-checkpoint operation with fixup code instructions, the partial commit-checkpoint comprising an instruction reference address to link the second instructions to the fixup code instructions without calculating register values associated therewith; and
a fixup code generator to save the fixup code instructions to a fixup code memory.

14. An apparatus as defined in claim 13, further comprising a fixup code fetch module to retrieve the fixup code associated with the partial commit-checkpoint operation in response to a request to obtain a precise processor state.

15. An apparatus as defined in claim 13, further comprising a recovery logic module to invoke the fixup code instructions in response to a request for a precise processor state.

16. A machine readable storage medium comprising instructions that, when executed, cause a machine to, at least:
distinguish between first instructions and candidate instructions from a region of instructions, the candidate instructions to produce an unused value in the region of instructions;
generate a processor partial commit-checkpoint to save a current state of a processor, the partial commit-checkpoint based on calculated register values associated with the first instructions; and
generate an instruction reference address to link the candidate instructions to fixup code to prevent calculating register values associated with the candidate instructions in response to a speculative execution event.

17. A machine readable storage medium as defined in claim 16 wherein the machine accessible instructions, when executed, cause the machine to generate the fixup code based on the candidate instructions to associate with the instruction reference address.

18. A machine readable storage medium as defined in claim 17, wherein the machine accessible instructions, when executed, cause the machine to recover a state associated with the candidate instructions via the fixup code in response to a processor recovery instruction.

19. A machine readable storage medium as defined in claim 17 wherein the machine accessible instructions, when executed, cause the machine to save the fixup code to a memory that is accessible by an exception handler.

* * * * *